United States Patent
Agarwal et al.

(10) Patent No.: US 9,563,786 B1
(45) Date of Patent: *Feb. 7, 2017

(54) INTER-PROCESS ACCESS CONTROL

(71) Applicant: International Business Machines Corporation, Armonk, NY (US)

(72) Inventors: Amit Agarwal, Bangalore (IN); Faraz Ahmad, Bareilly (IN); Uma Maheswara R. Chandolu, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,220

(22) Filed: Dec. 28, 2015

Related U.S. Application Data

(63) Continuation of application No. 14/868,480, filed on Sep. 29, 2015.

(51) Int. Cl.
  *G06F 7/04* (2006.01)
  *G06F 21/62* (2013.01)
  *G06F 21/53* (2013.01)

(52) U.S. Cl.
  CPC .......... *G06F 21/6218* (2013.01); *G06F 21/53* (2013.01); *G06F 2221/2141* (2013.01); *G06F 2221/2149* (2013.01)

(58) Field of Classification Search
  None
  See application file for complete search history.

(56) References Cited

U.S. PATENT DOCUMENTS

| | | | |
|---|---|---|---|
| 7,882,317 B2 | 2/2011 | Hunt et al. | |
| 8,819,231 B2 | 8/2014 | Chandolu et al. | |
| 8,943,500 B1 | 1/2015 | Havemose | |
| 2008/0127292 A1* | 5/2008 | Cooper | G06F 21/53 726/1 |
| 2009/0282477 A1* | 11/2009 | Chen | G06F 21/51 726/22 |
| 2012/0151552 A1 | 6/2012 | Kandasamy et al. | |
| 2012/0185510 A1 | 7/2012 | Desai et al. | |
| 2014/0115580 A1* | 4/2014 | Kellerman | H04N 21/4437 718/1 |

OTHER PUBLICATIONS

Agarwal et al., "Inter-Process Access Control", U.S. Appl. No. 14/868,480, filed Sep. 29, 2015.
IBM, "List of IBM Patents or Patent Applications Treated as Related", Jun. 14, 2016, 2 pages.

* cited by examiner

*Primary Examiner* — Brandon Hoffman
(74) *Attorney, Agent, or Firm* — Nolan M. Lawrence

(57) ABSTRACT

A kernel receives a request to execute a first process instance from an agent. The first process instance is an instance of a first program. The kernel obtains one or more access control rules related to the agent. The kernel permits execution of the first process instances based on the access control rules. The kernel detects the first process instance attempting to access a second process instance during execution of the first process instance. The second process instance is an instance of a second program currently being executed. The kernel determines whether to grant the first process instance permission to access the second process instances based on the access control rules.

1 Claim, 3 Drawing Sheets

INTER-PROCESS ACCESS CONTROL

BACKGROUND

The present disclosure relates to inter-process communication, and more specifically, to granting and denying access between process instances.

Inter-process communication may enable higher performance computing by allowing operations to be performed on multi-core processors. Inter-process communication may enable more scalable computing by allowing distributed computing systems and hardware from multiple computers to perform operations cooperatively. Inter-process communication may enable more efficient computing by separating larger programs into smaller programs. Inter-process communication may be used by computers in various fields such as business, medicine, and science.

SUMMARY

Disclosed herein are embodiments of a method and a computer program product for process access control in an operating system. A kernel receives a request to execute a first process instance from an agent. The first process instance is an instance of a first program. The kernel obtains one or more access control rules related to the agent. The kernel permits execution of the first process instances based on the access control rules. The kernel detects the first process instance attempting to access a second process instance during execution of the first process instance. The second process instance is an instance of a second program currently being executed. The kernel determines whether to grant the first process instance permission to access the second process instances based on the access control rules.

Also disclosed herein are embodiments of a system for process access control. A memory stores an operating system, one or more instances of program processes, and one or more access control rules. An input receives one or more process requests from one or more agents. A processor, which is in communication with the memory and the input, executes a kernel of the operating system. The kernel receives a first process-execution request from the input. The first request is to execute a first process instance of a first program. The kernel obtains a first access control rule from the memory. The first access control rule is related to an agent. The kernel permits execution of the first process instance based on the first access control rule. The kernel detects the first process instance attempting to access a second process instance. The second process instance is an instance of a second program currently being executed by the processor. The kernel obtains a second access control rule from the memory. The second access control rule is related to the second process instance. The kernel determines whether to grant the first process instance permission to access the second process instance based on the second access control rule.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
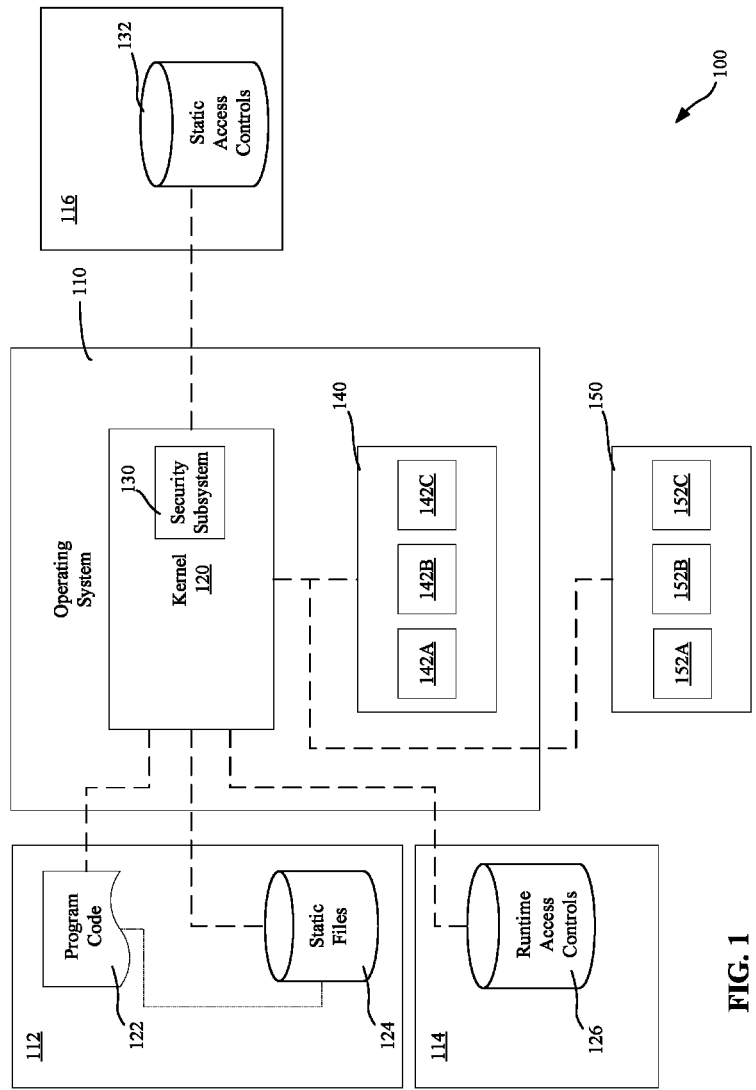
FIG. 1 depicts a system to enable access control between processes running on a computer consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to inter-process communication, and more specifically, to granting and denying access between process instances by validating access controls during runtime. While the present disclosure is not necessarily limited to such applications, various aspects of the disclosure may be appreciated through a discussion of various examples using this context.

Access control mechanisms (ACMs) may be used to grant and deny access to various resources of computer systems. ACMs may grant and deny access to computer hardware (e.g., network devices, segments of random access memory, computer processing cycles, etc.). ACMs may also grant and deny access to various software objects, such as text documents or image files. An ACM may be useful for large organizations because it enables granular control over the users within the organizations that wish to perform operations (herein, subjects). An ACM also enables granular control over the variety of software and hardware resources (herein, objects). Administrators of computing systems in large organizations may utilize ACMs to create rules or permissions relating to operations that subjects wish to perform upon objects (e.g., a first user may read a specific directory, a group of users may read and write to an entire network disk, a second group of users may not access certain programs, etc.).

Computer systems have advanced in complexity and capability. Computers are increasingly parallel in nature both in the hardware as well as in the software methodologies that run on that hardware. One cause of this increase in parallelism is the advent of multithreading or multiprocessing where a computing task is broken into multiple smaller tasks (processes) to be spread across multiple processing cores of a central processing unit (e.g., a processor). Multiprocessing is facilitated through the use of one or more software components (e.g., an operating system, a kernel component of the operating system, etc.). Along with parallelism, processes may need the ability to directly share information or operate upon each other. To provide this functionality the operating system may permit inter-process communication (IPC).

An inter-process communication (IPC) controller may enable an ACM implementation of security during execution of programs in a multiprocessing environment. In some embodiments, the IPC controller may be one or more existing software programs that facilitate operation of and resource allocation of computing resources (e.g., an operating system, a kernel, a hypervisor, a microkernel, etc.). In some embodiments, the IPC controller may be one or more existing software programs designed to facilitate ACM between non-process objects, such as a security or access manager. The IPC controller may be a segment of software that facilitates communications between existing programs, such as an IPC controller communicating between a kernel and an access control module.

Processes may need to access one another and the IPC controller may facilitate these accesses by applying one or more rules. The ACM implemented by an IPC controller may be based on one or more methodologies (e.g., discretionary access control, role based access control, rule based access control, mandatory action control, action control lists, and domain control role based access control, etc.). The aforementioned access control methodologies should be appreciated to be non-limiting and are listed for example purposes. The IPC controller may implement rules controlling the ability of a subject process, executed by an agent, to access an object process. The agent may be a human user of a computing system, such as an email subsystem administrator and the rules may be in part based on the permissions given to the human user. The agent may be another process. For example, in a situation where an image editor process calls an image viewer process, the image editor process could be an agent and the image viewer process could be the subject process. Continuing the example, if the image viewer process tries to access a file system process (an object process), the rules may be in part based on the privileges of and the permissions given to the image editor process.

In some embodiments, the IPC controller may implement rules for a subject process to access an object process that are similar to existing rules (e.g., read, write, full control, etc.) for access to non-process objects. For example, the IPC controller may control what a first process may access by selectively granting or denying the first process's a request to read a second process based on a rule that sets the bounds of the first process's read access permissions. The IPC controller may implement rules for a subject process to access an object process that are unique to IPC between two processes. (e.g., launch, execute, kill, terminate, request status, update status, etc.). The IPC controller may implement multiple levels of rules from separate ACMs for a subject process to access an object process (e.g., granting or denying access of a first process to a second process based on a role based access control mechanism and a domain access control mechanism).

In some embodiments, a kernel may implement runtime privileges (domains) validation for a process. For example, when an object (process A) is started by a first user (user A), the object (process A) inherits the domains which are assigned to the first user (user A). When subject (process B) is started by a second user (user B), the subject (process B) inherits the domains of the second user (user B). User and process privileges are stored in the kernel by a security sub system. If the second user (user B) has the same domains as the first user (user A), the subject process (process B) may be granted permission to access the object (process A). Run time validation is done by the security subsystem before allowing subject process (process B) to access the object process (process A).

Continuing the example, if the object (process A) is started by a third user (user C), the object (process A) will have different set of domains—the object (process A) inherits domains of the third user (user C). If the second user (user B) has different domains from the third user (user C), the subject process (process B) may be denied permission to access the object (process A).

Figure 3:
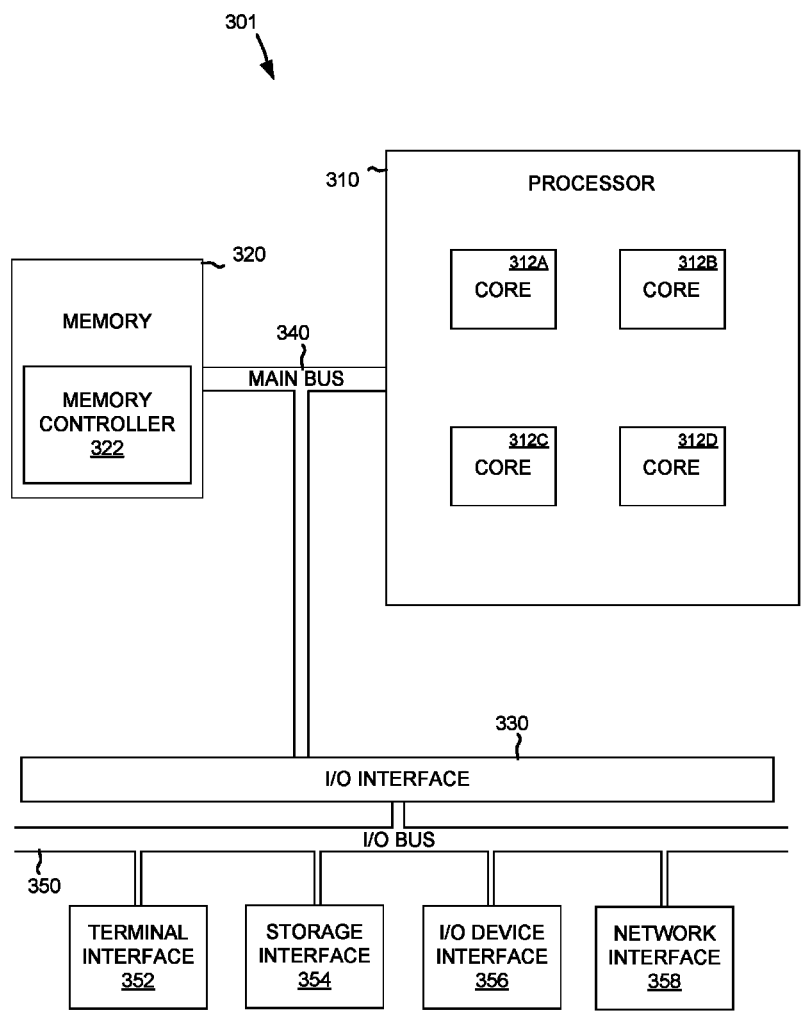
FIG. 3 depicts the representative major components of an example computer system that may be used, in accordance with embodiments of the present disclosure.

FIG. 1 depicts a system 100 to enable access control between processes running on a computer consistent with embodiments of the present disclosure. Though not depicted the computer may include various hardware, such as a processor, memory, and input output devices. An example computer that may be consistent with embodiments is depicted in FIG. 3. The system 100 may include an operating system 110, a system storage 112, a first secure storage 114, and a second secure storage 116. The operating system 110 may include the following: a kernel 120 for directing operation of the other components of the system 100; a security subsystem 130 for implementing ACMs for non-process objects; a system runtime memory 140 for executing instances of operating system related programs.

The operating system 110 may also control a user runtime memory 150 for executing instances of user programs. The system runtime memory 140 may be a logical or virtual partition of a hardware memory of a computer being controlled by the operating system 110. The user runtime memory 150 may be a second logical or virtual partition of the hardware memory of the computer. The separation between the user runtime memory 150 and the system runtime memory 140 may provide increased security of the operating system 110 and associated components (e.g., preventing access between user and system runtime memories without a specific grant of permission). It should be appreciated that the memory separation of system 100 of FIG. 1 is depicted for example purposes, and that another configuration of various memory separations may be consistent with embodiments of the present disclosure (e.g., user applications, user mode, kernel mode, standard libraries, system extensions, etc.).

The kernel 120 may be configured to provide access to one or more resources of the system 100 (e.g., processors, memory, input devices, output devices, network devices, etc.). The kernel 120 may include one or more associated low levels components (not depicted) to help facilitate running process instances of one or more programs. The kernel 120 may control the system storage 112, the first secure storage 114, and the second secure storage 116. In some embodiments, the security subsystem 130 may control the second secure storage 116. The system storage 112 may include program code 122 and static files 124. The program code 122 may be stored in the static files 124. Program code 122 may be a collection of various programs, such as binaries or libraries. The static files 124 may be a file system containing various static (e.g., non-process) objects, including, for example, files and folders, such as documents, images, program executables, and the like. The first secure storage 114 may include runtime access controls 126. The runtime access controls 126 may be a collection of one or more entries that describe process to process access control rules (e.g., any instance of a music player process may submit requests to any file system process instance for music files). The second secure storage 116 may include static access controls 132. The static access controls 132 may be a collection of one or more entries that describe process to object access control rules (e.g., an instance of a file viewer process running from a first agent may only access a folder with ownership rights of the first agent). In some embodiments, the first secure storage 114 and the second secure storage 116 may be the same storage and the runtime access controls 126 and the static access controls 132 may be kept together in the same storage. In some embodiments, the first secure storage 114 may be separate from the second secure storage 116. The secure storages may be separate because the format of the entries of the runtime access controls 126 may be different from the format of the entries of the static access controls 132.

The system runtime memory 140 may host process instances 142A, 142B, and 142C (collectively, 142). For example process instance 142A may be a network card process that controls a network card, process instance 142B may be a file system process that controls reads and writes to a file system, and process instance 142C may be a graphics card process that controls image manipulation calls. The user runtime memory 150 may host process instances 152A, 152B, and 152C (collectively, 152). For example process instance 152A may be an image editor process that a user uses to manipulate pictures, process instance 152B may be a file viewer process that a user uses to open and save various types of documents, and process instance 152C may be a web browser that a user uses to connect to the internet. It should be appreciated that the operating system 110 may be able to host more or less process instances than are depicted herein. The process instances may be processes based on code stored in the program code 122.

The kernel 120 may provide access to hardware and software resources of a computer (not depicted) hosting the system 100. The kernel 120 may provide access directly by utilizing the security subsystem 130 of the kernel. In detail, the kernel 120 may receive a request from an agent to retrieve a file from the static files 124. The kernel 120 may coordinate with the security subsystem 130 to verify if the agent has permission to retrieve the file. The kernel 120 may send information related to the agent to the security subsystem 130, such as username, real name, location, or role. The security subsystem 130 may transmit to the kernel 120 one or more entries from the static access controls 132. The entries may include a list of objects that the agent has permission to access and what level of access the agent is permitted (e.g., agent may read a file, agent may make a request to a network device, agent may create or modify files on a disk drive, an agent may launch a program at a specified timeframe, etc.). The kernel 120 may compare the entries to the request from the agent to determine whether the agent should be granted permission to access the requested file. In response to the comparison, the kernel 120 may either grant or deny the agent access to the file from the static files 124.

The kernel 120 may also permit a first process to access a second process during execution of the first and second processes. As described herein, execution means at any time during which one or more processes are currently running on one or more processing circuits of a computer system. A process may be running on one or more processing circuits in a wait state or an active state. A process may include one or more instances of running code segments from a program executable (e.g., such as a program binary, a subroutine in a library file, etc.) and may be a process instance in any of the following program lifecycle phases: link time, load time, and run time. In some embodiments a process may be consider as being executed, executing, or running even though a processor may not be performing operations upon the process at a specific instant (e.g., where the process instance is in a wait state).

For example, a single-threaded single-processor central processing unit may be tasked, by an operating system, to perform process A and process B. The central processing unit may be begin by performing operations of process A. The central processing unit, or the operating system may place process B in a queued state. At this point, both process A and process B may be considered to be executing or running on the central processing unit. The central processing unit may pause the performance of operations of process A and may place process A in a wait or paused state. Still, process A and process B may be considered to be executing or running on the central processing unit. The central processing unit may begin performing operations of process B, and after an appreciable time, may place process A in an idle or hibernating state. Further still, process A and process B may be considered to be executing or running on the central processing unit.

The kernel 120 may control process to process access by one or more rules. The control may be exerted between two processes in the user runtime memory 150. The control may be exerted between a process in the system runtime memory 140 and a process in the user runtime memory 150. The control may be exerted between two processes in the system runtime memory 140. For example, process 142A (the subject) may attempt to access process 142B (the object) (e.g., process 142A may request to terminate process 142B). Upon detecting the activity of process 142A, the kernel 120 may identify an agent associated with process 142A. The kernel 120 may retrieve from the runtime access controls 126 entries associated with process 142A, process 142B, or both process 142A and process 142B. The kernel 120 may determine based on the entries whether process 142A has permission to access process 142B (e.g., rules indicating permission to terminate process 142B). The kernel 120 may grant process 142A access to process 142B if an entry that contains the permission for the type of access requested is found in the entries (e.g., process 142A may terminate process 142B if the kernel 120 finds a rule granting termination permission of process 142B to process 142A).

If the kernel 120 does not find any entries related specifically to process 142A and 142B, the kernel may determine rules related to process 142A and process 142B based on the programs from which they were invoked. For example, in one situation process 142A is a first process instance based on a first binary from program code 122. Process 142B is a second process instance based on a second binary from program code 122. Process 142B may be stored in a first directory of the static files 124. The kernel 120 may retrieve from the static access controls 132 entries associated with the second binary. The kernel 120 may retrieve the entries from an intermediary such as the security subsystem 130. If the kernel 120 finds entries related to the second binary in the static access controls 132, the kernel 120 may try to grant or deny access based on those entries. For example, if the agent that invoked process 142A has full control over the first directory in the static files 124, then kernel 120 may grant process 142A access to process 142B. If the kernel 120 finds entries related to the second binary in the static access controls 132, the kernel 120 may try to create corresponding entries regarding process 142B in the runtime access controls 126.

Figure 2:
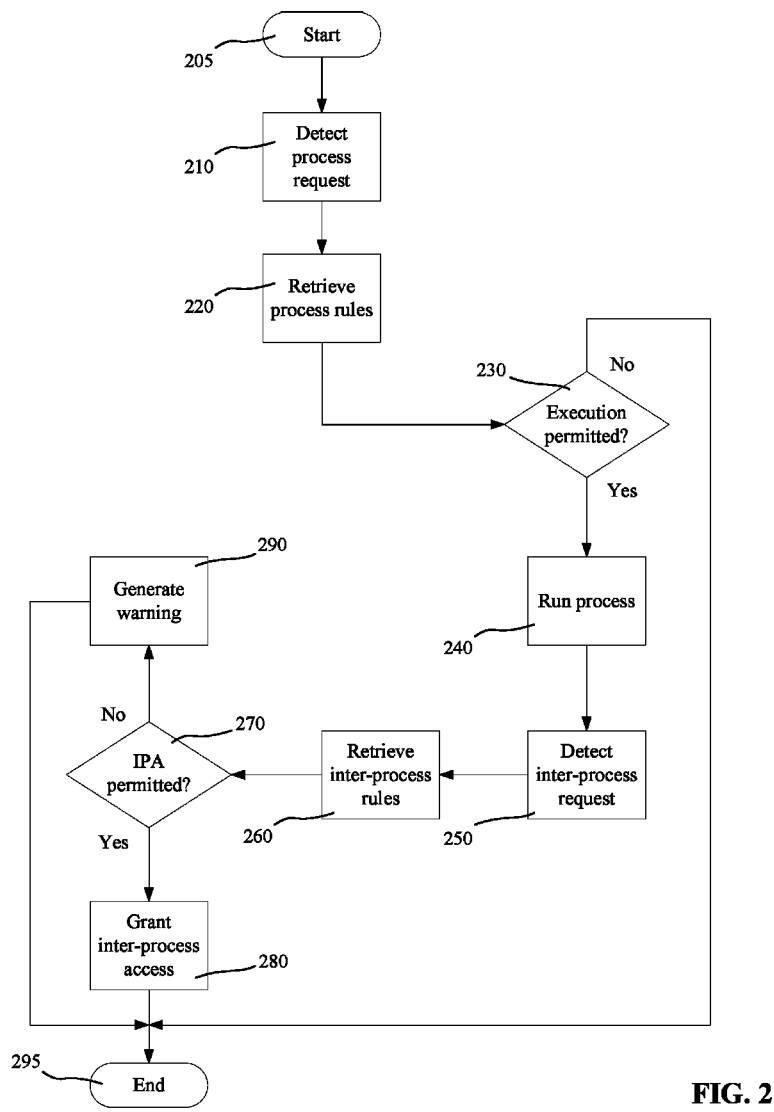
FIG. 2 depicts an example method for performing granular access control between processes consistent with embodiments of the present disclosure.

FIG. 2 depicts an example method 200 for performing granular access control between processes consistent with embodiments of the present disclosure. Method 200 may be executed by an operating system charged with facilitating execution of multiple processes on computer hardware detailed in the present embodiments. Method 200 may perform operation in addition to or different than those depicted in FIG. 2. In some embodiments, operations depicted in FIG. 2 may be combined or separated into a different configuration of method 200.

From start 205, an operating system may detect a process request, at 210, to execute a first process. The process request, at 210, may come from a first user of the operating system. In response to detecting the process request, at 210, the operating system may retrieve, at 220, one or more process access rules relating to the first process and the first user. The process access rules may include rules regarding what files and folders the first user may read, modify, and delete. The process access rules may also include rules regarding what programs a user may launch (or execute).

If the first user is permitted, at 230, to execute the first process, then the operating system may run an instance of the first process at 240. Whether the first user is permitted to run the first process may be based upon the process access rules retrieved at 220. During execution of the first process instance, at 240, the operating system may monitor the execution of the first process instance. The operating system may detect an inter-process request, at 250, from the first process instance to a second process instance. For example, the first process may be thought of as a subject process and the second process an object process that the subject process wants to interact with in some manner, such as a read request. The operating system may retrieve, at 260, one or more inter-process access rules relating to the inter-process request. The rules relating to the inter-process request may include rules related to the first user, the first process, the first process instance, the second process, and/or the second process instance. The inter-process access rules may also include rules regarding whether one program, while executing as a process instance, may access other program process instances. In some embodiments, the operating system may fail to retrieve, at 260, rules relating to the inter-process request (e.g., no rules exist).

If the first process instance is permitted, at 270, to access the second process instance, then the operating system may grant the inter-process access at 280. Whether the first process instance is permitted to access the second process instance may be based upon the inter-process access rules retrieved (or failed to be retrieved) at 260. If the first process instance is not permitted, at 270, to access the second process instance, then the operating system may generate, at 290, a warning regarding the unauthorized inter-process access attempt. In an optional operation (not depicted and after the operation at 290) the operating system may transmit the warning to an administrative user. In another optional operation (not depicted) if the first process instance is not permitted, at 270, to access the second process instance, then the operating system may limit the first process from accessing any other process or static object of the system (e.g., sandboxing). After the inter-process access has been granted at 280 (or after process execution is not permitted at 230, or after warning generation at 290) method 200 ends at 295.

FIG. 3 depicts the representative major components of an example computer system 301 that may be used, in accordance with embodiments of the present disclosure. It is appreciated that individual components may vary in complexity, number, type, and\or configuration. The particular examples disclosed are for example purposes only and are not necessarily the only such variations. The computer system 301 may comprise a processor 310, memory 320, an input/output interface (herein I/O or I/O interface) 330, and a main bus 340. The main bus 340 may provide communication pathways for the other components of the computer system 301. In some embodiments, the main bus 340 may connect to other components such as a specialized digital signal processor (not depicted).

The processor 310 of the computer system 301 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or methods consistent with embodiments of the present disclosure. In some embodiments, the computer system 301 may contain multiple processors 310. In some embodiments, the computer system 301 may be a single processor 310 with a singular core 312.

The memory 320 of the computer system 301 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 356, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 356, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 301—including but not limited to the memory 320, the processor 310, and the I/O interface 330—may communicate failures and changes to one or more components to a hypervisor or operating system (not depicted). The hypervisor or the operating system may allocate the various resources available in the computer system 301 and track the location of data in memory 320 and of processes assigned to various cores 312. In embodiments that combine or rearrange elements, aspects and capabilities of the logic modules may be combined or redistributed. These variations would be apparent to one skilled in the art.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of process access control in an operating system, the method comprising:
    receiving, by a kernel and from an agent, a request to execute a first process instance of a first program;
    obtaining, by the kernel, one or more access control rules related to the agent, wherein the one or more access control rules permit the first process instance to access one or more files or folders, and wherein the one or more access control rules also permit the first process instance to access a third process instance;

permitting, by the kernel and based on the one or more access control rules, execution of the first process instance;

detecting, by the kernel and during execution of the first process instance, the first process instance attempting to access a second process instance of a second program currently being executed;

denying, by the kernel and based on the one or more access control rules, the first process instance permission to access the second process instance; and sandboxing, by the kernel and based on the denied access to the second process instance, the first process instance from the one or more files or folders and the third process instance.

* * * * *